US010979745B1

(12) United States Patent
Gouneili et al.

(10) Patent No.: US 10,979,745 B1
(45) Date of Patent: Apr. 13, 2021

(54) SYSTEM AND METHOD FOR SECURE CONTENT STREAMING, CONTENT GOVERNANCE AND STREAMING FRAUD PREVENTION

(71) Applicants: Razmun Gouneili, Tiburon, CA (US); Behzad Nadji, Tiburon, CA (US)

(72) Inventors: Razmun Gouneili, Tiburon, CA (US); Behzad Nadji, Tiburon, CA (US)

( * ) Notice: Subject to any disclaimer, the term of this patent is extended or adjusted under 35 U.S.C. 154(b) by 0 days.

(21) Appl. No.: 16/996,679

(22) Filed: Aug. 18, 2020

Related U.S. Application Data

(60) Provisional application No. 62/888,513, filed on Aug. 18, 2019.

(51) Int. Cl.
| | |
|---|---|
| *H04N 21/2347* | (2011.01) |
| *H04L 9/08* | (2006.01) |
| *H04N 21/2543* | (2011.01) |
| *H04N 21/81* | (2011.01) |
| *G06N 5/00* | (2006.01) |
| *H04N 21/25* | (2011.01) |

(52) U.S. Cl.
CPC ......... *H04N 21/2347* (2013.01); *G06N 5/003* (2013.01); *H04L 9/0825* (2013.01); *H04L 9/0833* (2013.01); *H04N 21/251* (2013.01); *H04N 21/2543* (2013.01); *H04N 21/812* (2013.01)

(58) Field of Classification Search
CPC .................................................. H04N 21/2347
See application file for complete search history.

(56) References Cited

U.S. PATENT DOCUMENTS

| | | | | |
|---|---|---|---|---|
| 2002/0059144 A1* | 5/2002 | Meffert | ............... | H04L 63/0442 705/51 |
| 2016/0042157 A1* | 2/2016 | Drope | ................ | H04N 21/6125 713/165 |
| 2020/0275146 A1* | 8/2020 | Moroney | ......... | H04N 21/25841 |

* cited by examiner

*Primary Examiner* — Michael H Hong
(74) *Attorney, Agent, or Firm* — Steven A. Nielsen; www.NielsenPatents.com

(57) ABSTRACT

A system configured for a format to control streaming of content, comprising: a content player module configured to enable a first user to request contents on a first computing device through search keywords on the content player module; request continuous play of the contents from pre-established station on the content player module, the content streaming service module configured to send symmetric encryption keys to content player module on the first computing device through a secure communication between first user and second user, content streaming service module configured to deliver the requested contents to content player module through a payload data, when the content player module starts playing the contents, content player module configured to connect to the content streaming service module to identify which content is being used, by whom, on what device and in which location for accurate accounting of used contents and use in fraud prevention heuristics.

20 Claims, 9 Drawing Sheets

SYSTEM AND METHOD FOR SECURE CONTENT STREAMING, CONTENT GOVERNANCE AND STREAMING FRAUD PREVENTION

CROSS-REFERENCE TO RELATED APPLICATIONS

This patent application claims priority benefit of U.S. Provisional Patent Application No. 62/888,513 entitled "A METHOD AND APPARATUS FOR SECURE AUDIO AND VIDEO STREAMING, CONTENT GOVERNANCE AND STREAMING FRAUD PREVENTION", filed on Aug. 18, 2019. The entire contents of the patent application is hereby incorporated by reference herein in its entirety.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

TECHNICAL FIELD

The disclosed subject matter relates generally to a system and method for managing content. More particularly, the system and method for secure content streaming, content governance and streaming fraud prevention.

BACKGROUND

Over the years, a variety of different approaches have been developed to detect and prevent the fraudulent use of the content. The content includes audios, videos, images, and websites, text (multimedia content) that is being used, for example a movie or an audio track. Nowadays, to gain client confidence and prevent revenue loss, a content owner desires an accurate and trustworthy way of detecting possible fraud. Growing popularity with online services, including social networking, mobile banking, has increased the incidence and expense of identity and digital content fraud online Existing systems asking for the user name, address, phone number, and e-mail address may not be sufficient to detect and determine a probable fraudulent content because such information may be altered, manipulated, fraudulently obtained, or simply false.

Content owners often have very little visibility into who is using the content and where the stream content is being used within the internet from digital streaming platforms (DSP's), and non-digital streaming platforms (DP's). Tracking, accounting, and deleting of content is poor and content owners and digital platforms are often defrauded from being correctly compensated, and collecting their usage meta data. Tracking and controlling of the content, if it exists, is reactive as opposed to being proactive. There are several short comings in the architecture of the most current digital content streaming infrastructures, and most current multimedia formats: media content and digital platforms are subject to fraud by being susceptible to illegal piracy, copyright infringement, and a spectrum of illegal manipulative tactics: ripping or downloading the original content into a copy for other usage purposes, offline download and cache misusages to prevent further subscription transactions, copy and pasting an image or text from the internet to a user's device, virtual and artificial machine generated clickbot, such as fake streaming a content to get compensated or manipulate the streaming numbers, device screen and sound recordings, third party software that block ads and watermarks from freemium model revenues, and account password sharing.

In the light of the aforementioned discussion, there exists a need for a system that allows significant reduction in possibility of fraud and provides precise and up-to-the-minute tracking, management, governance, and accounting of the content.

SUMMARY

The following presents a simplified summary of the disclosure in order to provide a basic understanding of the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

An objective of the present disclosure is directed towards a system that allows significant reduction in possibility of third party fraud and provides precise and up-to-the-minute tracking, management, governance, and accounting of the streams of a multimedia.

Another objective of the present disclosure is directed towards a system that streams the requested content to a user and also collects various information from the user and other sources.

Another objective of the present disclosure is directed towards a system that provides secure and fast communication between the player and streaming service.

Another objective of the present disclosure is directed towards a system that prevents illegal copying, manipulative tactics, and man-in-the-middle attacks.

Another objective of the present disclosure is directed towards a system that provides accurate tracking and accounting for content owner compensation.

Another objective of the present disclosure is directed towards a system that provides a universal portal to outline statistics and predictions about their usage or play history, as well as demographics on where, when and on what device the content is being used.

Another objective of the present disclosure is directed towards a system that provides more alternatives for customer billing and analytics.

Another objective of the present disclosure is directed towards a system that uses a highly secure public key infrastructure for authentication.

Another objective of the present disclosure is directed towards a system that guarantees identification of the streaming service through highly secure public key infrastructure.

Another objective of the present disclosure is directed towards a system that ensures the first computing device and the content streaming service module uses a private/public key for secure authentication.

Another objective of the present disclosure is directed towards a system that encrypts the communication between the first computing device and the content streaming service module by exchanging the symmetric encryption key for fast and highly secure communication.

Another objective of the present disclosure is directed towards a system that provides accurate accounting, more options for billing alternatives, and analytics through the content streaming service module.

Another objective of the present disclosure is directed towards a system that provides accurate call-home data for predictions, edits, compositions, sales, targeted marketing and advertising.

Another objective of the present disclosure is directed towards system that prevents to clone the call-home data by a virtual and artificial machine generated click-bot attack prevention module.

In an embodiment of the present disclosure, the system comprising a content player module configured to enable a first user to request one or more contents on a first computing device through at least one of: search including voice search one or more keywords on the content player module; request continuous play or usage of the one more contents from a pre-established station or service on the content player module.

In another embodiment of the present disclosure, the system further comprising a content streaming service module configured to establish a PKI (public key infrastructure) for a secure communication between the content player module on the first computing device and a second computing device when a first user's login request received from the content player module to the content streaming service module, the content streaming service module configured to send one or more symmetric encryption keys to the content player module on the first computing device through the PKI for the secure communication between the first user and a second user, the content streaming service module configured to deliver the requested one or more contents to the content player module through a payload data that includes stream of contents as well as a management data, when the content player module starts playing or using the one or more contents, the content player module configured to connect to the content streaming service module with a call-home data, whereby the call-home data comprises which content is being played or used, by whom, on what device and in which location for accurate accounting of played and used contents and use in fraud prevention heuristics.

BRIEF DESCRIPTION OF THE DRAWINGS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

FIG. 1 depicts a schematic representation of the system for secure content streaming, content governance and streaming fraud prevention, in accordance with one or more exemplary embodiments.

Figure 1:
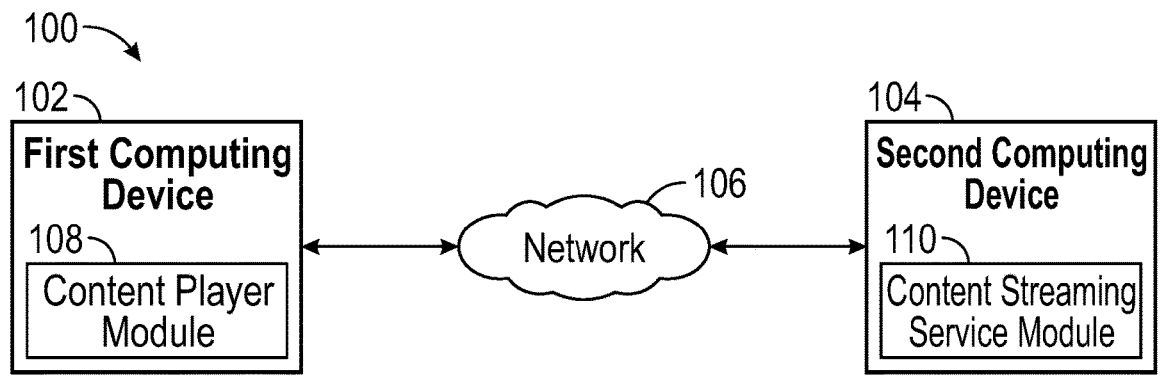
FIG. 1 is a block diagram representing a system in which aspects of the present disclosure can be implemented. Specifically.

Furthermore, the objects and advantages of this invention will become apparent from the following description and the accompanying annexed drawings.

REFERENCE NUMERALS IN THE DRAWINGS

Figure 2:
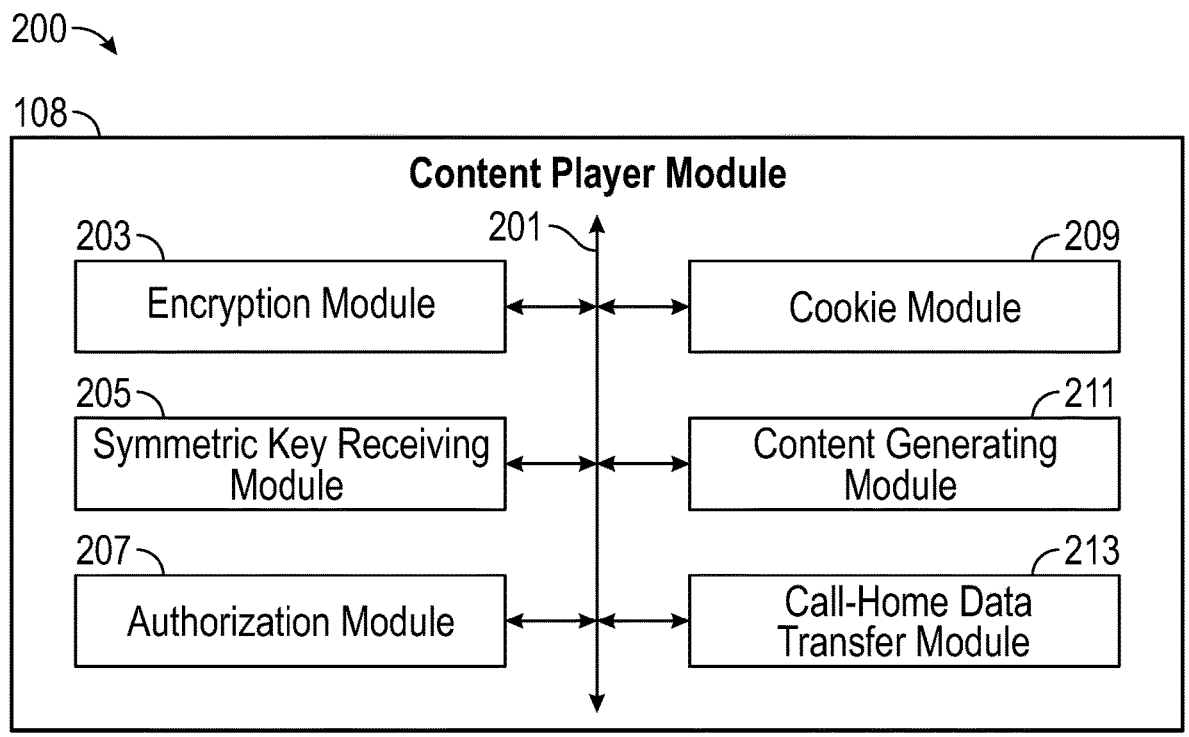
FIG. 2 is a block diagram depicting a schematic representation of the content player module 108 shown in FIG. 1, in accordance with one or more exemplary embodiments.
Figure 3:
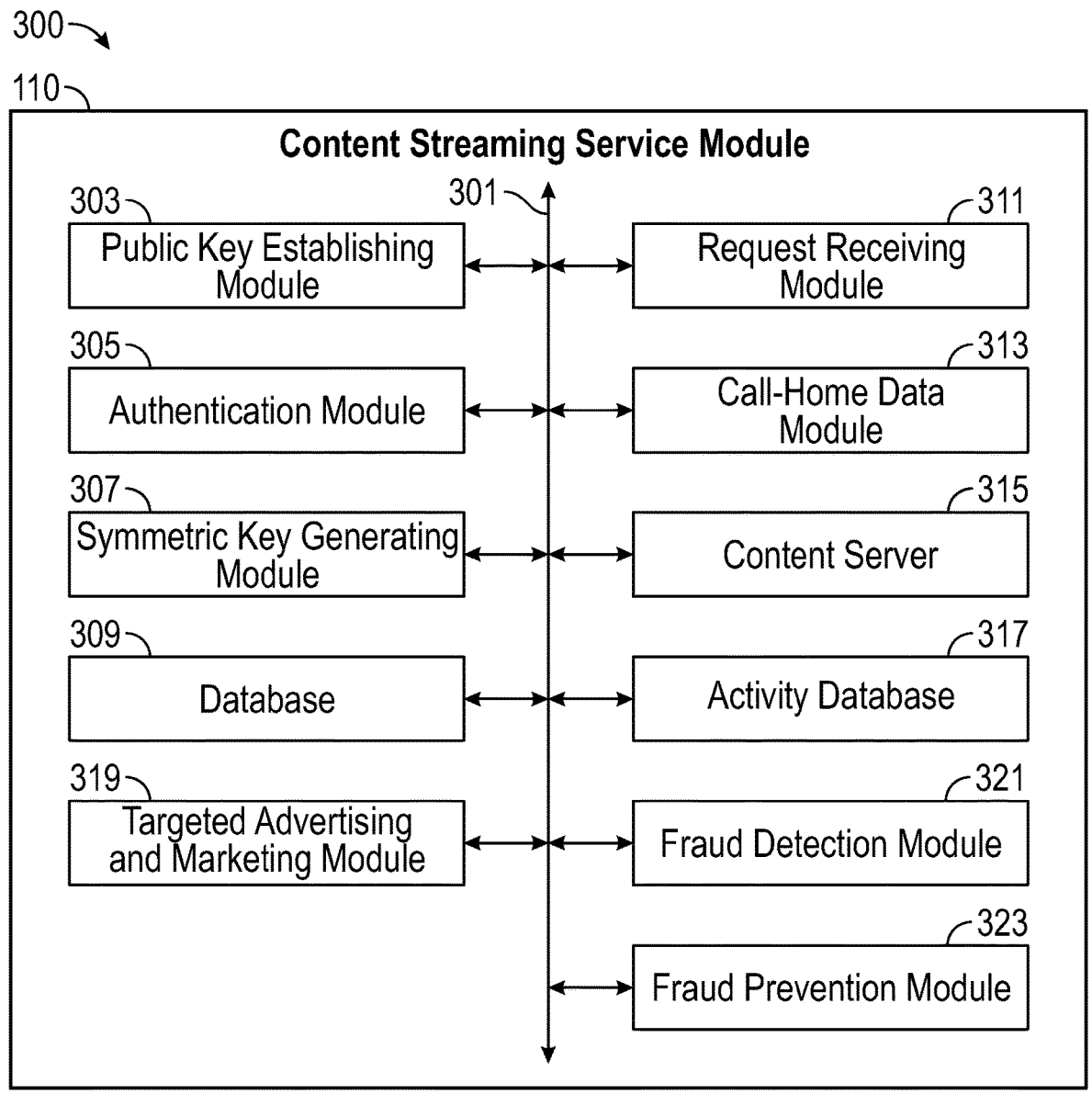
FIG. 3 is a block diagram depicting a schematic representation of the content streaming service module 110 shown in FIG. 1, in accordance with one or more exemplary embodiments.
Figure 4:
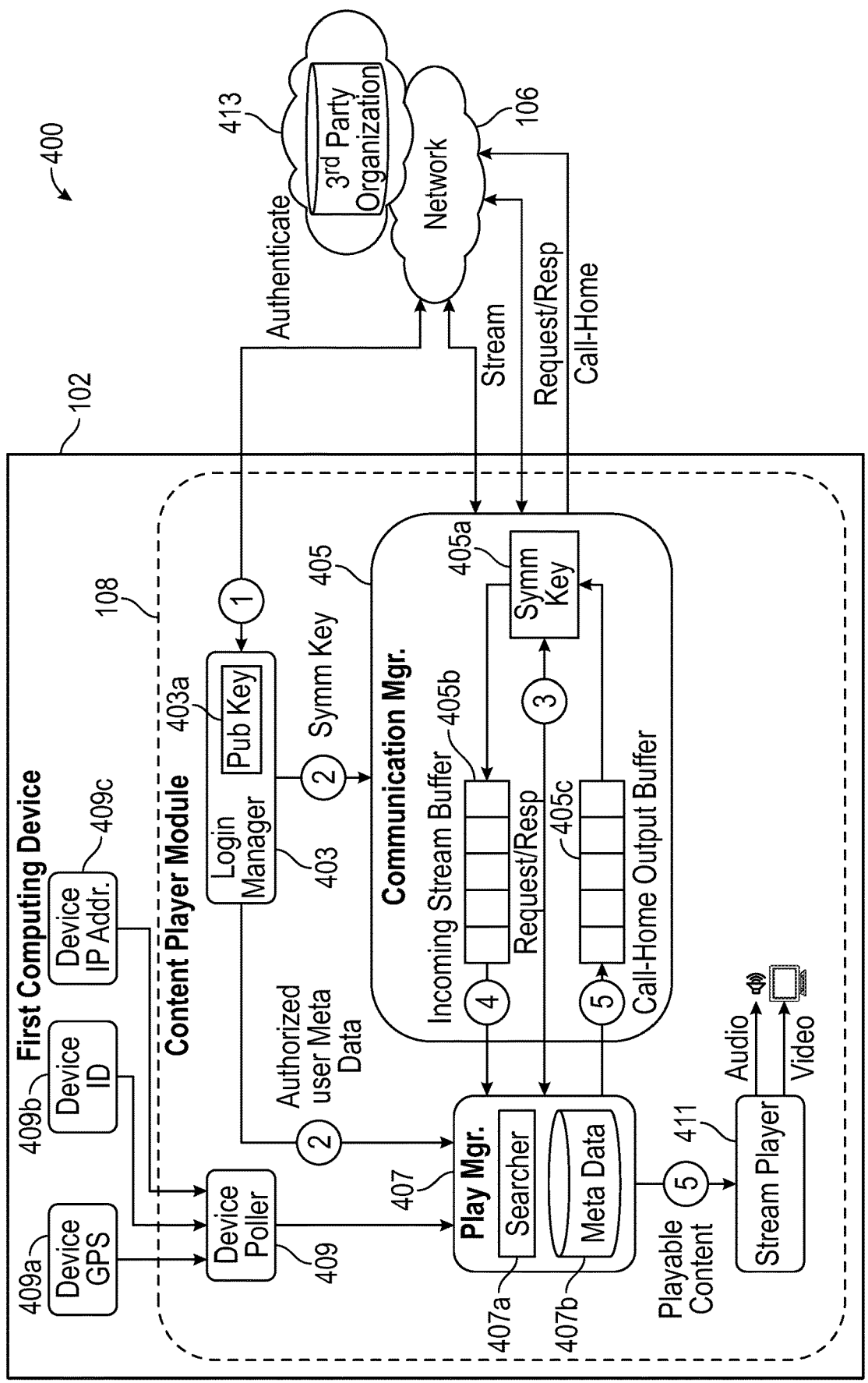
FIG. 4 is an example diagram depicting an architecture of the content player module 108 installed on the first computing device 102 shown in FIG. 1, in accordance with one or more exemplary embodiments.
Figure 5:
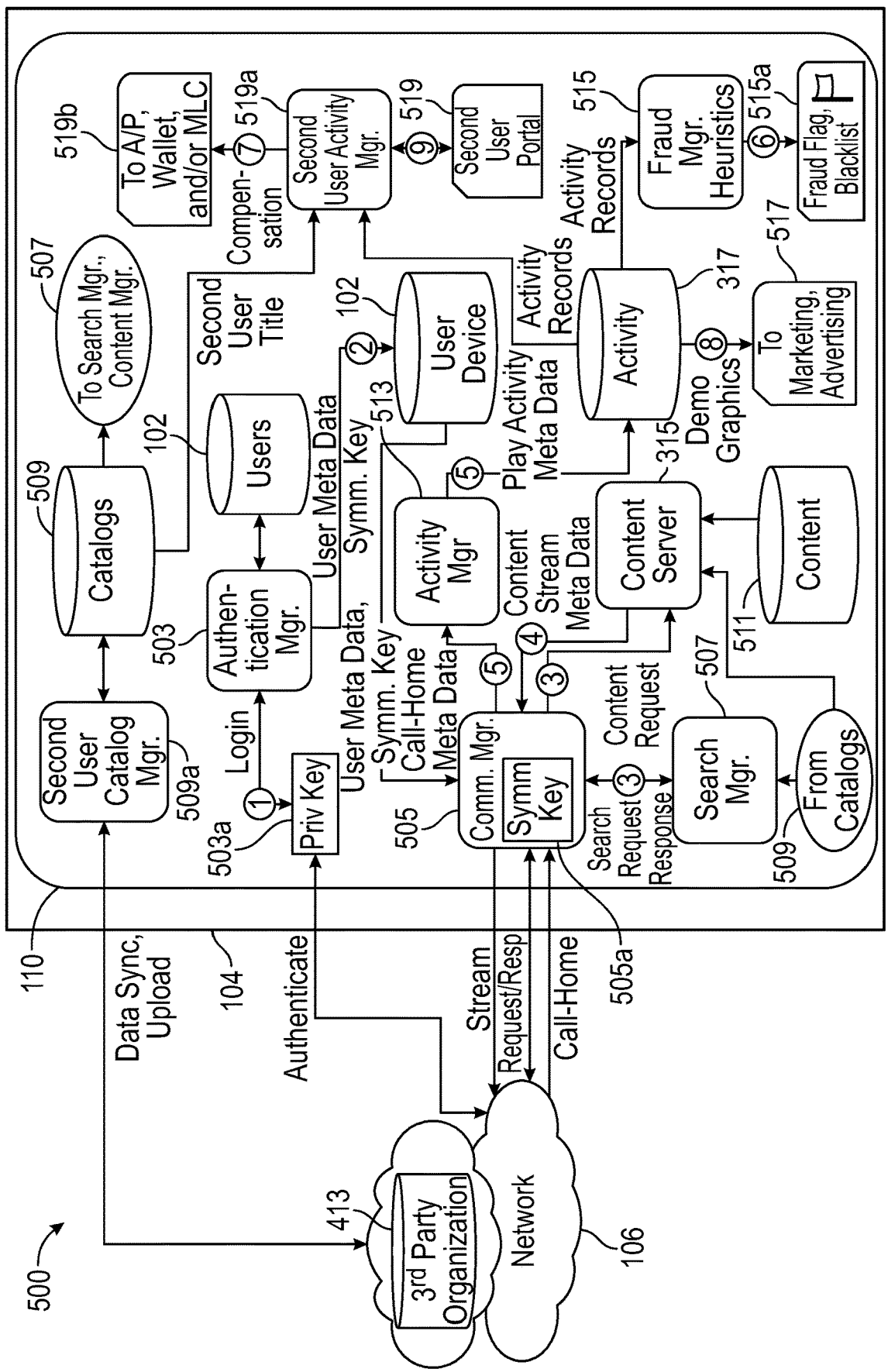
FIG. 5 is an example diagram depicting an architecture of the content streaming service module 110 installed on the second computing device 104 shown in FIG. 1, in accordance with one or more exemplary embodiments.
Figure 6:
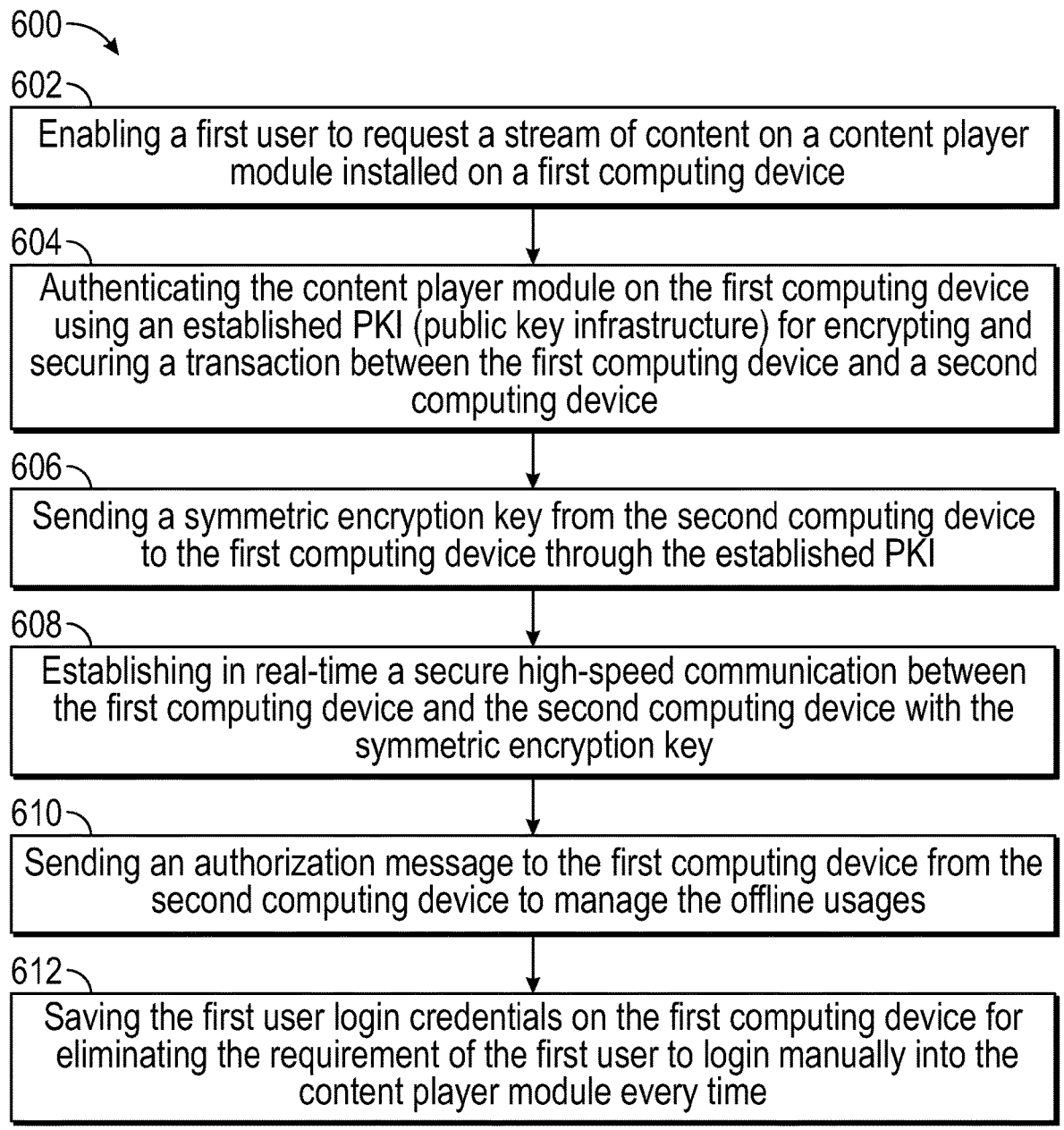
FIG. 6 is an example flow diagram depicting a method for saving the first user login credentials, in accordance with one or more exemplary embodiments.
Figure 7:
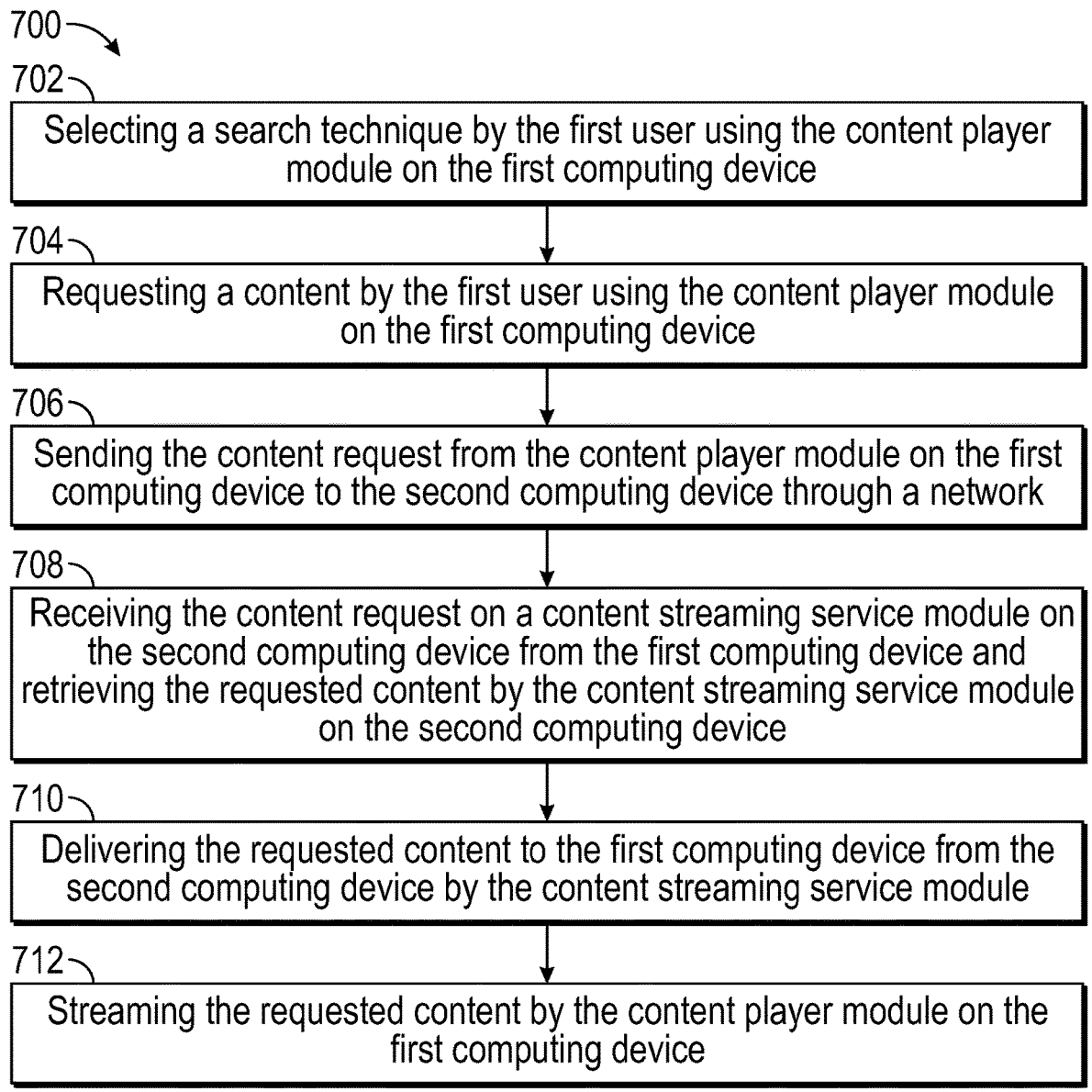
FIG. 7 is an example flow diagram depicting a method for streaming the requested content by the content player module, in accordance with one or more exemplary embodiments.
Figure 8:
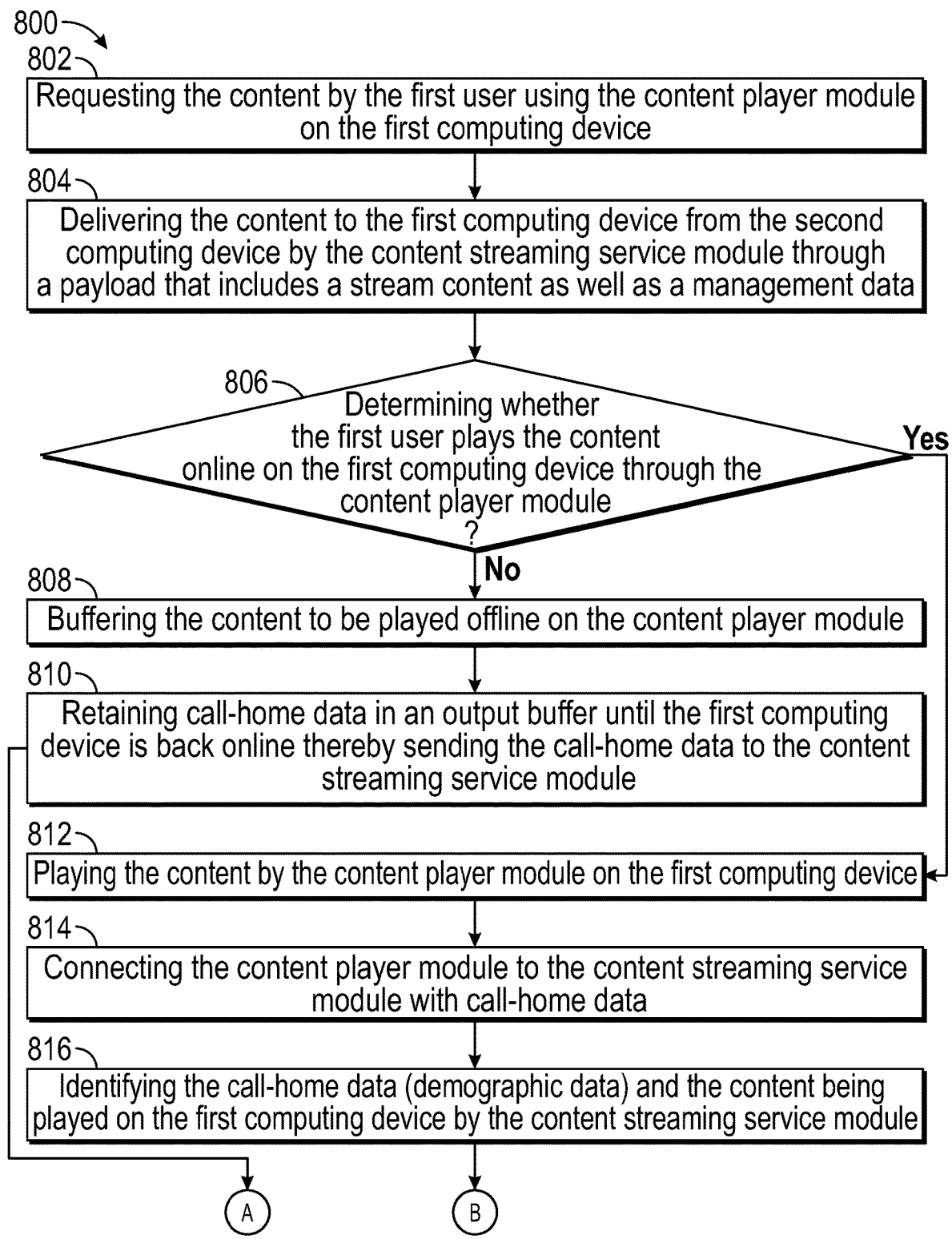
FIG. 8 is an example flow diagram depicting a method for securing and eliminating the usage of the content player module by third party modules, in accordance with one or more exemplary embodiments.
Figure 8:
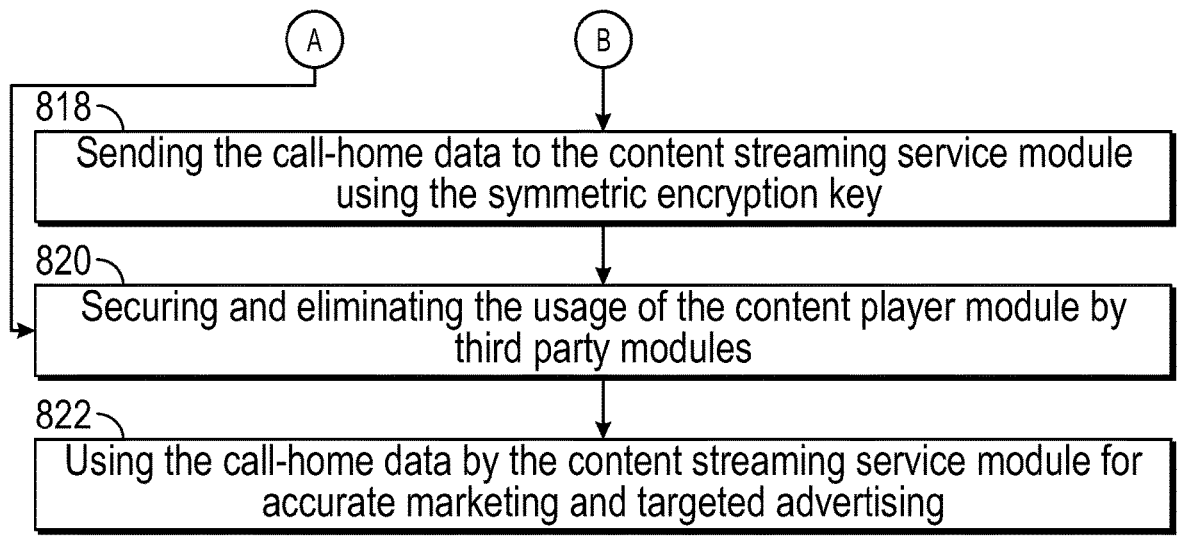
Figure 9:
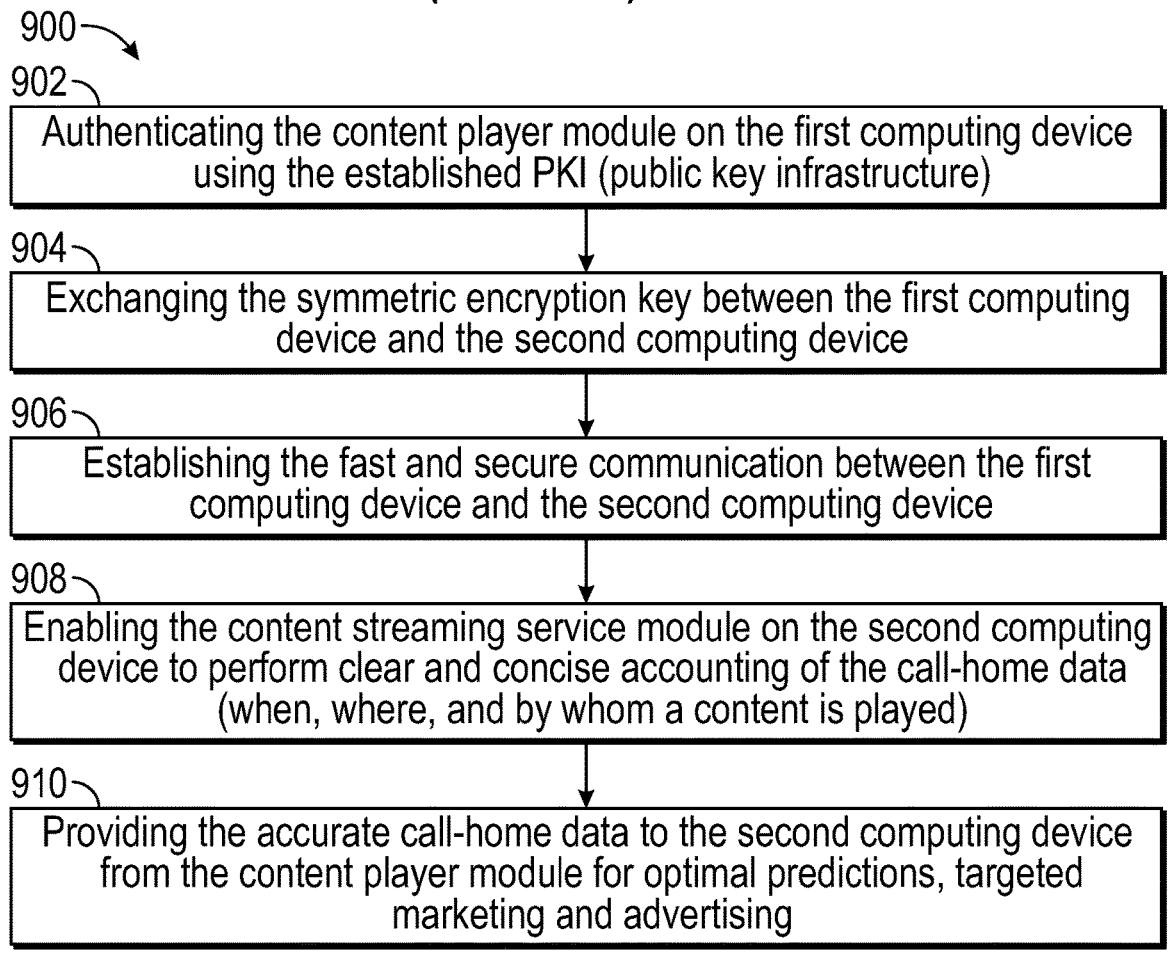
FIG. 9 is an example flow diagram depicting a method for providing the accurate call-home data to the second computing device from the content player module, in accordance with one or more exemplary embodiments.
Figure 10:
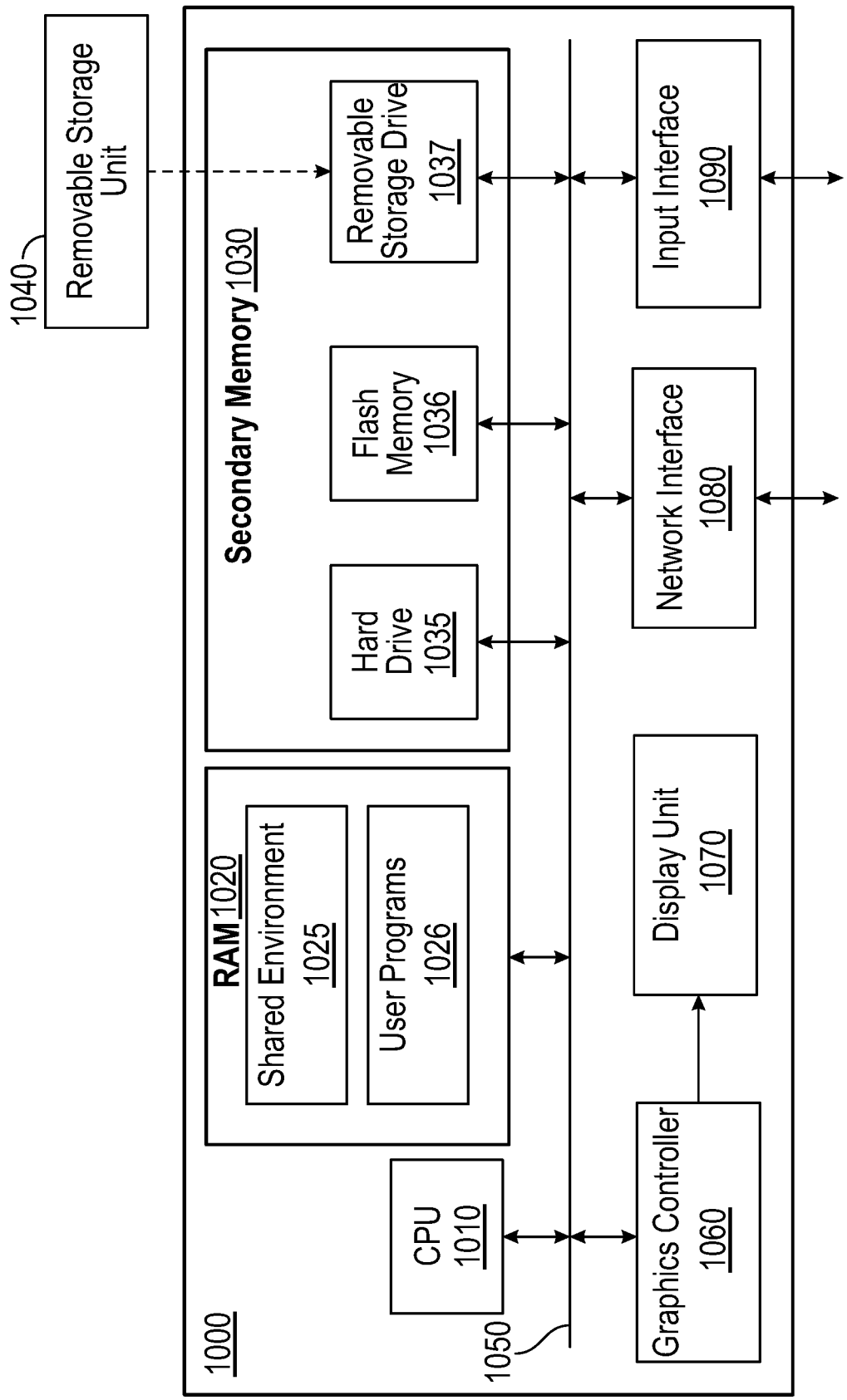
FIG. 10 is a block diagram illustrating the details of digital processing system in which various aspects of the present disclosure are operative by execution of appropriate software instructions.

FIG. 1, 100 discloses a system configured for controlled streaming of content
102 First Computing Device of 100 system
104 Second Computing Device of 100 system
106 Network of 100 system
108 Content Player Module of 100 system
110 Content Streaming Service Module of 100 system
  FIG. 2, 200 discloses a 108 Content Player Module of 100 system
201 Bus
203 Encryption Module
205 Symmetric Key Receiving Module
207 Authorization Module
209 Cookie Module
211 Content Generating Module
213 Call-Home Information Transfer Module
  FIG. 3, 300 discloses 110 Content Streaming Service Module of 100 system
110 Content Service Module
301 Bus
303 Public Key Establishing Module
305 Authentication Module
307 Symmetric Key Generating Module
309 Database
311 Request Receiving Module
313 Call-Home Information Module
315 Content Server
317 Activity Database
  FIG. 4, 400 discloses an example diagram 400 depicting architecture of the 108 content player module
403 a Login Manager
405 Communication Manager
407 Play Manager
409 Device Poller 411 Stream Player
403a established PKI of 403 Login Manager
413 3rd Party-Administered Database/3rd party-organization Database
405a Symmetric keys of 405 Communication Manager
405b Incoming Stream Buffer of 405 Communication Manager
405c Output Buffer 405c of 405 Communication Manager
407c Searcher of 407 Play Manager
407b Metadata of 407 Play Manager
409a Device GPS of 409 Device Poller
409b Device ID of 409 Device Poller
409c device IP address of 409 Device Poller
106 Network
  FIG. 5, 500 discloses an example diagram 400 depicting architecture of the 110 content streaming service module
503 Authentication Manager (Mgr.)
505 Communication Manager
507 Search Manager
509 Catalog Database
511 Content Database
315 Content Server
513 Activity Manager
515 Fraud Manager Heuristics
517 Marketing, Advertising Block
519 Second User Portal
503a PKI of 503 Authentication Manager
505a Symmetrical Encryption Key of 505 Communication Manager
509a Second User Catalog Manager
515a fraud flag blacklist of 515 fraud manager heuristics
519a second user activity manager of 519 Second User Portal
519b accounts payable, wallets of 519 Second User Portal
  FIG. 6, 600 discloses a method for saving the first user login credentials
602 Enabling a first user to request a stream to use or play of content on a content player module installed on a first computing device
604 Authenticating the content player module on the first computing device using an established PKI (public key infrastructure) for encrypting and securing a transaction between the first computing device and a second computing device
606 Sending a symmetric encryption key from the second computing device to the first computing device through the established PKI
608 Establishing in real-time a secure high-speed communication between the first computing device and the second computing device with the symmetric encryption key occurs
610 Sending an authorization message to the first computing device from the second computing device to manage the offline usages
612 saving the first user login credentials on the first computing device for eliminating the requirement of the first user to login manually into the content player module each time
  FIG. 7 discloses a method for streaming the requested content by the content player module
702 Selecting a search technique by the first user using the content player module on the first computing device
704 Requesting a content by the first user using the content player module on the first computing device
706 Sending the content request from the content player module on the first computing device to the second computing device through a network
708 Receiving the content request on a content streaming service module on the second computing device from the first computing device and retrieving the requested content by the content streaming service module on the second computing device
710 Delivering the requested content to the first computing device from the second computing device by the content streaming service module
712 Streaming the requested content by the content player module on the first computing device
  FIG. 8 discloses a method for securing and eliminating the usage of the content player module by third party modules
802 Requesting the content by the first user using the content player module on the first computing device
804 Delivering the content to the first computing device from the second computing device by the content streaming service module through a payload that includes a stream content as well as a management data
806 Determining whether the first user plays or uses the content online on the first computing device through the content player module
NO 808 Buffering the content to be played or used offline on the content player module
810 Retaining call-home data in an output buffer until the first computing device is back online thereby sending the call-home data to the content streaming service module
812 Playing and using the content by the content player module on the first computing device
814 Connecting the content player module to the content streaming service module with call-home data
816 Identifying the call-home data (demographic data) and the content being used or played on the first computing device by the content streaming service module
818 Sending the call-home data to the content streaming service module using the symmetric encryption key
820 Securing and eliminating the usage of the content player module by third party modules
822 Using the call-home data by the content streaming service module for accurate predictions, edits, compositions, sales, marketing and targeted advertising
  FIG. 9 discloses a method for providing the accurate call-home data to the second computing device from the content player module
902 Authenticating the content player module on the first computing device using the established PKI (public key infrastructure)
904 Exchanging the symmetric encryption key between the first computing device and the second computing device
906 Establishing the fast and secure communication between the first computing device and the second computing device
908 Enabling the content streaming service module on the second computing device to perform clear and concise accounting of the call-home data (when, where, and by whom a content is played or used)
910 Providing the accurate call-home data to the second computing device from the content player module for accurate predictions, edits, compositions, sales, targeted marketing and advertising
  FIG. 10—digital processing system corresponds to the computing device
1010 CPU
1020 Random Access Memory (RAM)
1025 Shared Environment of RAM 1020
1026 User Programs of RAM 1020
1030 Secondary Memory
1035 Hard Drive of secondary Memory 1030

1036 Flash Memory of secondary Memory 1030
1037 Removable Storage Drive of secondary Memory 1030
1040 Removable Storage Unit
1050 Communication Path
1060 Graphics Controller
1070 Display Unit
1080 Network Interface
1090 An Input Interface

DETAILED DESCRIPTION OF EXAMPLE
EMBODIMENTS

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

Referring to FIG. 1, FIG. 1 is a block diagram 100 representing a system in which aspects of the present disclosure can be implemented. Specifically, FIG. 1 depicts a schematic representation of the system for secure content streaming, content governance and streaming fraud prevention, in accordance with one or more exemplary embodiments. The system 100 includes a first computing device 102, and a second computing device 104 operatively coupled to each other through a network 106. The network 106 may include, but is not limited to, an Ethernet, a wireless local area network (WLAN), or a wide area network (WAN), a Bluetooth low energy network, a ZigBee network, a WIFI communication network e.g., the wireless high speed internet, or a combination of networks, a cellular service such as a 4G (e.g., LTE, mobile WiMAX) or 5G cellular data service, a RFID module, a NFC module, wired cables, such as the world-wide-web based Internet, or other types of networks may include Transport Control Protocol/Internet Protocol (TCP/IP) or device addresses (e.g. network-based MAC addresses, or those provided in a proprietary networking protocol, such as Modbus TCP, or by using appropriate data feeds to obtain data from various web services, including retrieving XML data from an HTTP address, then traversing the XML for a particular node) and the like without limiting the scope of the present disclosure. The system 100 is preferably realized as a computer-implemented system in that the first and second computing devices (102, 104) are configured as computer-based electronic devices.

Although the first and second computing devices 102, 104 are shown in FIG. 1, an embodiment of the system 100 may support any number of computing devices. The system 100 may support only one computing device (102 or 104). The computing devices 102, 104 may include, but are not limited to, a desktop computer, a personal mobile computing device such as a tablet computer, a laptop computer, or a netbook computer, a smartphone, a server, an augmented reality device, a virtual reality device, a digital media player, a piece of home entertainment equipment, backend servers hosting database and other software, and the like. Each computing device 102, 104 supported by the system 100 is realized as a computer-implemented or computer-based device having the hardware or firmware, software, and/or processing logic needed to carry out the intelligent messaging techniques and computer-implemented methodologies described in more detail herein. The first computing device 102 and/or the second computing device 104 may be configured to display features by a content player module 108, a content streaming service module 110. The features may be helpful to find out the content on the first computing device 102 and/or the second computing device 104. The first computing device 102 and/or the second computing device 104 may be operated by a first user and a second user. The first user may include, but not limited to, a client, a player, an individual, a stakeholder, an advertiser, a sponsor, an employee, an organization, and the like. The second user may include, but not limited to, a content owner, a content creator, a content performer, a content provider, a blogger, an author, a practitioner, an expert, and the like.

The content player module 108, and the content streaming service module 110 which are accessed as a mobile application, web application, software that offers the functionality of mobile applications, and viewing/processing of interactive pages, for example, are implemented in the first and second computing devices 102, 104 as will be apparent to one skilled in the relevant arts by reading the disclosure provided herein. For example, the first computing device 102 includes the content player module 108 (for example, mobile application) downloaded from a cloud server (not shown). Whereas the second computing device 104 may be directly accessed the content streaming service module 110 (for example, web application). The content player module 108, and the content streaming service module 110 may be any suitable application downloaded from GOOGLE PLAY® (for Google Android devices), Apple Inc.'s APP STORE® (for Apple devices), or any other suitable database. In some embodiments, the content player module 108 and the content streaming service module 110 may be software, firmware, or hardware that is integrated into the first and second computing devices 102 and 104.

The content player module 108 may be the software that resides on the first computing device 102 and is responsible for using or playing the requested content. The content streaming service module 110 is the entity that is responsible for streaming the requested content to the first user on the first computing device 102. The content streaming service module 110 may be configured to collect various information from the first user and other sources. The content streaming service module 110 may be configured to provide secure and fast communication between the first user (for example, player) and the second user (for example, streaming service provider). The content player module 108 and the content streaming service module 110 may be configured to prevent illegal copying, manipulative tactics, and man-in-the-middle attacks on the first computing device 102 and the second computing device 104. The content player module 108 and the content streaming service module 110 may also be configured to provide accurate tracking and accounting for second user compensation. The content player module 108 and the content streaming service module 110 may also be configured to provide a universal portal to outline statistics and predictions about their usage and play history, as well as demographics on where, when and on what device the content is being used. The content player module 108 and the content streaming service module 110 may be configured to provide more alternatives for customer billing and analytics.

FIG. 2 depicts a block diagram 200 depicting a schematic representation of the content player module 108 shown in FIG. 1, in accordance with one or more exemplary embodiments. The first computing device 102 includes the content player module 108. The content player module 108 includes an encryption module 203, a symmetric key receiving module 205, an authorization module 207, a cookie module 209, a content generating module 211, and a call-home data transfer module 213. The bus 201 may include a path that permits communication among the modules of the content player module 108. The term "module" is used broadly herein and refers generally to a program resident in memory of the computing device 102 or 104.

The encryption module 203 may be configured to securely authenticate itself (logs in to the second computing device 104) using an established PKI (public key infrastructure) for encrypting and securing the transaction. PKI is a common infrastructure used in the network 106 for ensuring secure communication between the first computing device 102 and the second computing device 104. Examples are a banking client and bank interactions, an ecommerce client and an ecommerce site transaction or any other business transaction that requires a secure encrypted communication. The encryption module 203 may be concise, proprietary, and encrypted handshakes and protocols for communicating with the content streaming service module 110. The communication and the content streaming service module 110 may not be based on insecure open web technology and, therefore, it is extremely hard and impractical to clone the app functions by a virtual and artificial machine generated click-bot.

After authentication, the symmetric key receiving module 205 may be configured to receive a symmetric key (through PKI) on the first computing device 102 from the second computing device 104 for future communication between the two entities. Symmetric keys may be used for secure high-speed communication between the first computing device 102 and the second computing device 104 and are appropriate for use in real time or near real time communication. The reason PKI may not be used for this purpose is the inherit latency of the non-symmetric public/private key encryption in PKI. From this point forward, only the symmetric key may be used for first and second computing device 102/104 communications.

After authentication, the content streaming service module 110 from the second computing device 104 may send an authorization message to the first computing device 102. The authorization module 207 may use the authorization message, to manage the offline usages and may include the following:
  a. Buffer Size: is the amount of content that can exist on the first computing device 102 in a play or usage buffer at the same time. Buffering may be used by the first user to buffer a number of contents for offline use (e.g., for in-flight use). Buffer size limits the number of streams that may be buffered.
  b. Time-To-Live: Buffered content time-to-live on the first computing device 102. This is to ensure that the streamed content may not stay forever on the first computing device 102 and self-erases after time-to-live is expired.

The cookie module 209 may be configured to save user login credentials using cookies on the first computing device 102 so the first user may not be compelled to manually login into the content player module 108 each time.

The first user requests the content through the content generating module 211 on the first computing device 102. The request may be completed through several methods mentioned below:
  a. Start a search, including voice search by any keyword (e.g., a title, artist, genre), that may identify one or more contents
  b. Request a continuous usage or play of contents from a pre-established service or "station" that has the desired genre (similar to online radio).

Regardless of the technique employed for selecting the content, the content request may also include the following identifiers namely:
  a. User ID: the ID of the user used during login process,
  b. The first computing device ID: a unique device identifier, e.g., serial number
  c. Location ID: first computing device location ID is either obtained by the content player module 108 through querying the geo coordinates from on device GPS or, at a minimum, it is the IP address of the device which may be used to narrow down the device location
  d. The request time timestamp The requested content may be sent by the content streaming service module 110 from the second computing device 104 to the content generating module 211 through a payload that includes a stream of content as well as the management data. The payload data that is included contains (in an encrypted format):
  a. The Content ID: this is a unique ID that is used by the content streaming service module 110 to identify the content (e.g. track of music, clip of video)
  b. Any other data that is useful for the player to display to the first user, such as, name, artist, genre, duration of the stream, etc.
  c. The stream content (audio, video, or other multimedia): this content may have any of the popular formats (e.g. .mp3, .mov) but it is part of the encrypted stream that may be embedded into the format.

When the content player module 108 starts playing the stream of content, it connects to the content streaming service module 110 (i.e., calls home) with the following information:
  a. Content ID of the played stream
  b. Device ID
  c. User ID
  d. Location ID
  e. Usage-Play start time timestamp
  f. Etc.

The call-home data transfer module 213 may be configured to send call-home data to the content streaming service module 110 using the symmetric encryption key and thus is secure and may not be simulated by any third-party software. The call-home data may include, but not limited to, demographic data, analytic data, and the like. The call-home data may also be used for accurate predictions, edits, compositions, sales, targeted marketing and advertising.

If the content is buffered for offline play or usage, the call-home data transfer module 213 is configured to send call-home data to the content streaming service module 110 (or buffered if the device is offline) when the stream is actually played or used.

If the first computing device 102 is offline when the content is used or played, the call-home data transfer module 213 configured to keep Call-Home information in an output buffer until the first computing device 102 is back online and then transmitted to the content streaming service module 110.

The call-home data transfer module 213 may be configured to allow the content streaming service module 110 to have a clear and concise accounting of when, where, and by whom a stream is used or played. This leads to:

Instant, up-to-the-minute minute and accurate second user content owner compensation.

Different client billing alternatives, e.g., billing by used or played streams as opposed to monthly fixed billing.

Provides accurate call-home data that may be used for predictions, edits, compositions, sales, targeted marketing and advertising. The call-home data may better support a freemium model in which the free content streaming service module 110 is supported by advertising and watermarks.

Referring to FIG. 3, FIG. 3 is a block diagram 300 depicting a schematic representation of the content streaming service module 110 shown in FIG. 1, in accordance with one or more exemplary embodiments. The content streaming service module 110 includes a public key establishing module 303, an authentication module 305, a symmetric key generating module 307, and a database 309, a request receiving module 311, a call-home data module 313, a content server 315, an activity database 317, an targeted advertising and marketing module 319, fraud detection module 321 and fraud prevention module 323. The bus 301 may include a path that permits communication among the modules of the content streaming service module 110. The term "module" is used broadly herein and refers generally to a program resident in memory of the computing device 102 or 104.

The content streaming service module 110 is the entity that is responsible for streaming the requested content to the first user. It may be part of the second users' infrastructure or may be a separate entity. When a login request is received from the content player module 108, the public key establishing module 303 establishes a PKI infrastructure between the content streaming service module 110 and itself for secure dialogue. Establishing PKI normally involves engaging a third-party certificate authority-CA. However, in this case, since the content player module 108 is designed specifically to work with the content streaming service module 110, the content streaming service module 110 may already have the public key built into it, thus obviating the need for a CA.

Once the PKI is established, the authentication module 305 may authenticate the user through pre-established login credentials within a user credentials table 1 shown in FIG. 5.

After successful authentication, the symmetric key generating module 307 randomly generates a symmetrical encryption key, based on the user ID and device ID. The symmetrical encryption key may be used henceforth for communication between the content player module 108 on the first computing device and the content streaming service module 110. Different first users may have different symmetric encryption keys for communication with the content streaming service module 110. Also, if the first user has multiple devices (e.g., a cellphone, a tablet, a PC), each device may establish its own symmetric key for communication with the content streaming service module 110 even though the login credentials remain the same. In addition, for added security, this symmetric key may be regenerated every time the content player module 108 logs in to the service.

The request receiving module 311 may be configured to respond to the first user's requests for searching, including voice search various content based on the provided keywords. It does that by consulting its catalogues. Such catalogues are optionally synchronized with the database 309. The database 309 may be a $3^{rd}$ party-administered database 413. The $3^{rd}$ party-administered database may include 3rd party organization database (shown in FIG. 4 and FIG. 5) i.e., it may be an organization such as the mechanical licensing collective (MLC). The request receiving module 311 eventually receives the user's request for playing or using one or more of the selected contents with the given content ID. The user's request includes the user's ID, device ID, other identifiers, and the like. Finally, the content server 315 may be configured to send the requested content from a content database (shown in FIG. 5) to the first computing device 102 along with a set of content identifying metadata.

When the content is actually played or used by the first user on the first computing device 102, the content server 315 identifies the call-home data such as the device, user, and location of the device among other data. The content server 315 may be configured to keep the data as a row in an activity table shown in FIG. 5.

The activity table may be an integral part of the call-home data module 313 and is used for several purposes namely:

a. The activity table is used to create an accurate accounts payables record for the second user compensation, b. The activity table is used by the fraud prevention heuristics.

c. The activity table is used for tracking content usage and plays and collect call-home data for further accurate predictions, edits, compositions, sales, marketing and targeted advertising.

The activity database 317 may be configured to store activities between the content player module 108 and the content streaming service module 110.

The targeted advertising and marketing module 319 may be configured to use the activity table for tracking content usage and plays and collect call-home data for further accurate predictions, edits, compositions, sales, marketing and targeted advertising. The targeted advertising and marketing module 319 may also be configured to use the call-home data in the activity table for accurate predictions, edits, compositions, sales, marketing and targeted advertising.

The fraud detection module 321 may be configured to detect the fraudulent use based on fraud detection heuristics and then the fraud detection module 321 may take appropriate action to prevent the fraud. Since the precise user usage history is available to the content streaming service module 110, fraud detection module 321 may use the following data to define a heuristic to flag a fraudulent use:

Number of times content is used in a given period of time

If the same contents are used or played repeatedly on the same device

State of the player playback (e.g., mute playing)

The blacklist state, i.e., is the first user or device already blacklisted for potential fraudulent use.

The fraud prevention module 323 may be configured to provide one or more fraud-prevention policies such as the following may be formulated and executed:

"If the same first user plays or uses the same content from the same Content Owner more than n times in an m hour period, raise a flag and stop serving the stream to that device for a p hour period."

"If the first user attempts to duplicate the content, raise a flag on the first user and self-erase the content"

"If the first user shares their account to another user, raise a flag on the first user and stop that account from being shared"

"If the first user attempts to screen record the content, raise a flag on the first user and stop the device from screen recording"

Referring to FIG. 4, FIG. 4 is an example diagram 400 depicting architecture of the content player module 108 installed on the first computing device 102 shown in FIG. 1, in accordance with one or more exemplary embodiments. The content player module 108 includes a login manager 403, a communication manager 405, a play manager 407, a device poller 409, and a stream player 411.

At path ① in FIG. 4, the content player module 108 may be configured to securely authenticate itself (logs in to the second computing device 104) using the established PKI 403a (Public Key Infrastructure) for encrypting and securing the transaction. The established PKI 403a may be in the login manager 403. The established PKI 403a is a common infrastructure used in the network 106 for ensuring secure communication between the first computing device 102 and the second computing device 104.

After authentication, the communication manager 405 receives a symmetric key 405a through the PKI 403a from the second computing device 104. Symmetric keys 405a may be used for secure high-speed communication between the first computing device 102 and the second computing device 104 and are appropriate for use in real time or near real time communication. The symmetric key may be used for all first user/second user communications.

After authentication, the second computing device 104 sends an authorization message to the player manager 407. The authorization message, used primarily to manage the offline usages, includes the followings:
  a. Buffer Size: is the amount of content that may exist on the first computing device 102 in a usage or play buffer/incoming stream buffer 405b at the same time. Buffering may be used by the first user to buffer 405b a number of streams for offline use (e.g., for in-flight use). Buffer Size limits the number of streams that can be buffered.
  b. Time-To-Live: Buffered content time-to-live on the first computing device 102. This is to ensure that the streamed content may not stay forever on the first computing device 102 and self-erases after Time-To-Live is expired.

At path ② in FIG. 4, for convenience, the content player module 108 uses standard methods for saving the user login credentials on the first computing device 102 (e.g., using cookies) so the first user is not forced to login manually into the content player module 108 every time.

At this point, both first and second computing devices 102, 104 possess the same symmetric encryption key 405a that may be used for all future communication. The first and second computing devices 102, 104 may be configured to maintain the symmetric key 405a until the next login which will refresh the key. The first user may not try to maintain a session state with the content streaming service module 110. Each request to the content streaming service module 110 is autonomous and includes the information needed by the content streaming service module 110 to stream the content. Also, the first user at this point is authenticated by the content streaming service module 110 as a legitimate user of the service through the standard login process.

The first user requests the content through several techniques:
  a. Start a search, including voice search by any keyword (e.g., a title, artist, genre) on a searcher 407a, that may identify one or more contents
  b. Request a continuous play or usage of contents from a pre-established service or "station" that has the desired genre (similar to online radio).

Regardless of the technique used for selecting the content, the content request also includes the following identifiers:
  a. User ID: the ID of the user used during login process,
  b. Device ID 409b: a unique device identifier, e.g., serial number
  c. Location ID/Device GPS 409a: the first user device location ID 409a is either obtained by the content player module 108 through querying the geo coordinates from on device GPS 409a or, at a minimum, it is the IP address 409c of the device which may be used to narrow down the device location
  d. The request time timestamp The device poller 409 allows the user to give the device GPS 409a, device ID 409b, and the device IP address 409c for selecting the content from the play manager 407.

At path ③ in FIG. 4, the requested content may be sent by the second computing device 104 to the content player module 108 through a payload that includes the stream content as well as the management data. The data that includes (in the encrypted format):
  a. The Content ID: this is a unique ID that is used by the Streaming Service to identify the stream (e.g. track of music, clip of video, image)
  b. Any other data that is useful for the player to display to the user, such as, name, Artist, genre, duration of the stream, etc.
  c. The stream content (audio, video, or other multimedia): this content may have any of the popular formats (e.g. .mp3, .mov) but it is part of the encrypted stream that may be embedded into the format.

At path ④ in FIG. 4, at this point the player manager 406 has the requested content and its associated metadata 407b. Depending on the first user's choice, it may buffer (to be played or used offline later) or use and play the content.

When the stream player 411 starts using or playing the content, it connects to the content Streaming Service module 110 (i.e., calls home) with the following information:
  a. Content ID of the played stream
  b. Device ID
  c. User ID
  d. Location ID
  e. Used-Play start time timestamp
  f. Etc.

The call-home is a key step in the whole process. Because at this time, the content streaming service module 110 knows which content is being used, by whom, on what device and in which location. This information may be vital to the content streaming service module 110 for accurate accounting of played and used streams, as well as use in fraud prevention heuristics. This data may be sent using the symmetric encryption key 405a and thus is secure and may not be simulated by a 3$^{rd}$ party-administered database 413. The call-home data may also be used for accurate predictions, edits, compositions, sales, targeted marketing and advertising.

At path ⑤ in FIG. 4, If the content is buffered for offline play or usage, the Call-Home data is sent (or buffered if the device is offline) to the content streaming service module 110 when the content is actually played or used.

If the device is offline when the content is played or used, the Call-Home data is kept in an output buffer 405c until the device 102 is back online and then sent to the content streaming service module 110.

Referring to FIG. 5, FIG. 5 is an example diagram 500 depicting architecture of the content streaming service module 110 installed on the second computing device 104 shown in FIG. 1, in accordance with one or more exemplary embodiments. The content streaming service module 110 includes an authentication manager 503, a communication manager 505, a search manager 507, a catalog database 509, a content database 511, the content server 315, an activity manager 513, a fraud manager heuristics 515, and marketing, advertising block 517, and a second user portal 519.

The content streaming service module 110 is the entity that is responsible for streaming the requested content to the first user on the first computing device 102. When a login request is received from the content player module 108 through the network 106, the content streaming service module 110 establishes the PKI infrastructure 503a between the content player module 108 and itself for secure dialogue. Establishing PKI 503a normally involves engaging a third party Certificate Authority—CA.

Once the PKI 503a is established, the content streaming service module 110 may authenticate the user through pre-established login credentials within user credentials table. Other user information along with some of user's authorization parameters are kept in the user credentials table:

TABLE 1

User Credentials Table

| User Name | User ID | User Password | User Authorized Feature Parameters | | Other . . . |
|---|---|---|---|---|---|
| | | | Buffer Size (Content) | Time-to-Live (sec) | |
| Joe Smith | ABC123GH | ********* | 100 | 86,400 | |
| Jane Doe | KLM456PQ | ********* | 50 | 43,200 | |

At path ① in FIG. 5, after successful authentication, the content streaming Service module 110 provides two sets of information to the content player module 108:

a. The content streaming service module 110 randomly generates the symmetrical encryption key 505a, based on the user ID and device ID. This key 505a may be used henceforth for communication between the content player module 108 on the first computing device 102 and the content streaming service module 110. This key 505a may be stored in the communication manager 505 (streaming service user-device table) for use with the requesting user. Different users may have different symmetric encryption keys for communication with the content streaming service module 110. Also, if the first user has multiple devices (e.g., a cellphone, a tablet, a PC), each device may establish its own symmetric key 505a for communication with the content streaming service module 110 even though the login credentials remain the same. In addition, for added security, this symmetric key 505a is regenerated every time the content player module 108 logs in to the service. See Table 2:

TABLE 2

USER-DEVICE TABLE

| User ID | Device ID | Symm. Key | Device Type | Other. . . |
|---|---|---|---|---|
| ABC123GH | ZZIOS1234 | Asd67$%^ddsf | iPhone 7 | . . . |
| ABC123GH | ZZAND5678 | Bp[qwwe7$#@ | Android Tablet | . . . |
| KLM456PQ | ZXWINPC12 | PnbG09&^%DR | Win10 PC | . . . | b. The content streaming service module 110 passes a set of metadata that defines user's level of authorization, shown in Table 2, User-Device Table.

This data may be communicated back to the content player module 108. The PKI 503a is torn down at this point as it is no longer needed. Further communication with the first computing device 102 may be through the established PKI 503a. The search manager 507 may be configured to search, including voice search any keyword (e.g., a title, artist, genre) to identify one or more contents.

At path ② in FIG. 5, the content streaming service module 110 responds to the first user requests for searching various content based on the provided keywords. It does that by consulting its Catalogs/second user catalog manager 509/509a. Such catalogs/second user catalog manager 509/509a are optionally synchronized with the $3^{rd}$ party-administered database 413.

At path ③ in FIG. 5, the content server 315 eventually receives the user's request from the communication manager 505 for playing or using one or more of the selected contents with the given content ID. The user's request includes the user's ID, device ID, other identifiers, and the like. Finally, the content server 315 may be configured to send the requested content from the content database 511 to the first computing device 102 along with a set of content identifying metadata.

At path ④ in FIG. 5, when the content is actually used or played by the first user on the first computing device 102, the content server 315 identifies the device, user, and location of the device among other data. The content server 315 may be configured to keep the data as a row in an activity table. There may be one row per content played or used:

TABLE 2

| | Activity Table | | | | |
|---|---|---|---|---|---|
| User ID | Device ID | Content ID | Location ID | Play Timestamp | Other . . . |
| ABC123GH | ZZIOS1234 | BILLYJEAN6 | 10.168.1.1 | 2018-10-12 10:23:34 | . . . |
| ABC123GH | ZZIOS1234 | CANTOUCH5 | 192.168.1.5 | 2018-10-12 12:28:23 | . . . |
| ABC123GH | ZZAND5678 | CANTOUCH5 | 192.168.1.5 | 2018-11-13 12:28:19 | . . . |

TABLE 2-continued

Activity Table

| User ID | Device ID | Content ID | Location ID | Play Timestamp | Other . . . |
|---|---|---|---|---|---|
| KLM456PQ | ZXWINPC12 | COMFNUM8 | 15.15.15.15 | 2018-12-12 11:28:25 | . . . |

At path ⑤ in FIG. 5, the activity table may be an integral part of the activity manager 513 and is used for several purposes:
   a. The activity table is used to create an accurate accounts payables record for the second user compensation,
   b. The activity table is used by the fraud prevention heuristics 515.
   c. The activity table is used for tracking content usage and plays and collect call-home data for further accurate predictions, edits, compositions, sales, marketing and targeted advertising.

The activity table may be used periodically for several purposes:
   a. At path ⑥ in FIG. 5, Fraud manager heuristics 515, and fraud flag blacklist 515a may be selected for fraud prevention details.
   b. At path ⑦ in FIG. 5, the second user Compensation: The table includes used content records, so a very accurate account of the second user's compensation may be calculated and sent to the accounts payable, Wallets 519b, or reported to a 3rd party index from a second user activity manager 519a.
   c. At path ⑧ in FIG. 5, targeted advertising and Marketing 517: the call-home data in the table may be used for accurate predictions, edits, compositions, sales, marketing and targeted advertising 517.

At path ⑨ in FIG. 5, the activity table along with the Catalogs database 509 may provide a second user portal 519 for the second user. the second user portal 519 may have content such as:
   a. Number of times their content was used
   b. Demographics on where and when their content was used
   c. Estimated compensation. This estimate may be finalized at the end of the payment period through compensation calculator as discussed previously
   d. Type of devices used in using their content
   e. Etc.

Referring to FIG. 6, FIG. 6 is an example flow diagram 600 depicting a method for saving the first user login credentials, in accordance with one or more exemplary embodiments. The method 700 may be carried out in the context of the details of FIG. 1, FIG. 2, FIG. 3, FIG. 4, and FIG. 5. However, the method 600 may also be carried out in any desired environment. Further, the aforementioned definitions may equally apply to the description below.

The method commences at step 602, enabling the first user to request the stream of content on the content player module installed on the first computing device. Thereafter at step 604, authenticating the content player module on the first computing device using the established PKI (public key infrastructure) for encrypting and securing the transaction between the first computing device and the second computing device. Thereafter at step 606, sending the symmetric encryption key from the second computing device to the first computing device through the established PKI. Thereafter at step 608, establishing in real-time a secure high-speed communication between the first computing device and the second computing device with the symmetric encryption key occurs. Thereafter at step 610, sending an authorization message to the first computing device from the second computing device to manage the offline usages. Thereafter at step 612, saving the first user login credentials on the first computing device for eliminating the requirement of the first user to login manually into the content player module each time.

Referring to FIG. 7, FIG. 7 is an example flow diagram 700 depicting a method for streaming the requested content by the content player module, in accordance with one or more exemplary embodiments. The method 700 may be carried out in the context of the details of FIG. 1, FIG. 2, FIG. 3, FIG. 4, FIG. 5, and FIG. 6. However, the method 700 may also be carried out in any desired environment. Further, the aforementioned definitions may equally apply to the description below.

The method commences at step 702, selecting the search technique by the first user using the content player module on the first computing device. Thereafter at step 704, requesting content by the first user using the content player module on the first computing device. Thereafter at step 706, sending the content request from the content player module on the first computing device to the second computing device through the network. Thereafter at step 708, receiving the content request on the content streaming service module on the second computing device from the first computing device and retrieving the requested content by the content streaming service module on the second computing device. Thereafter at step 710, delivering the requested content to the first computing device from the second computing device by the content streaming service module. Thereafter at step 712, streaming the requested content by the content player module on the first computing device.

Referring to FIG. 8, FIG. 8 is an example flow diagram 800 depicting a method for securing and eliminating the usage of the content player module by third party modules, in accordance with one or more exemplary embodiments. The method 800 may be carried out in the context of the details of FIG. 1, FIG. 2, FIG. 3, FIG. 4, FIG. 5, FIG. 6 and FIG. 7. However, the method 800 may also be carried out in any desired environment. Further, the aforementioned definitions may equally apply to the description below.

The method commences at step 802, requesting the content by the first user using the content player module on the first computing device. Thereafter at step 804, delivering the content to the first computing device from the second computing device by the content streaming service module through a payload that includes a stream content as well as a management data. Thereafter at step 806, determine whether the first user plays or uses the content online on the first computing device through the content player module. If answer to step 806 is NO, then the exemplary method continues at step 808, buffering the content to be used or played offline on the content player module. Thereafter at step 810, retaining call-home data in an output buffer until the first computing device is back online thereby sending the call-home data to the content streaming service module. If answer to step 806 is YES, then the exemplary method continues at step 812, playing or using the content by the content player module on the first computing device. Thereafter at step 814, connecting the content player module to the content streaming service module with call-home data. Thereafter at step 816, identifying the call-home data (demographic data) and the content being used or played on the first computing device by the content streaming service module. Thereafter at step 818, sending the call-home data to the content streaming service module using the symmetric encryption key. Thereafter at step 820, securing and eliminating the usage of the content player module by third party modules. Thereafter at step 822, using the call-home data by the content streaming service module for accurate predictions, edits, compositions, sales, marketing and targeted advertising.

Referring to FIG. 9, FIG. 9 is an example flow diagram 900 depicting a method for providing the accurate call-home data to the second computing device from the content player module, in accordance with one or more exemplary embodiments. The method 900 may be carried out in the context of the details of FIG. 1, FIG. 2, FIG. 3, FIG. 4, FIG. 5, FIG. 6, FIG. 7, and FIG. 8. However, the method 900 may also be carried out in any desired environment. Further, the aforementioned definitions may equally apply to the description below.

The method commences at step 902, authenticating the content player module on the first computing device using the established PKI (public key infrastructure). Thereafter at step 904, exchanging the symmetric encryption key between the first computing device and the second computing device. Thereafter at step 906, establishing the fast and secure communication between the first computing device and the second computing device. Thereafter at step 908, enabling the content streaming service module on the second computing device to perform clear and concise accounting of the call-home data (when, where, and by whom a content is played or used). Thereafter at step 910, providing the accurate call-home data to the second computing device from the content player module for accurate predictions, edits, compositions, sales, targeted marketing and advertising.

Referring to FIG. 10, FIG. 10 is a block diagram illustrating the details of digital processing system 1000 in which various aspects of the present disclosure are operative by execution of appropriate software instructions. Digital processing system 1000 may correspond to the first computing device 102 and the second computing device 104 (or any other system in which the various features disclosed above can be implemented).

Digital processing system 1000 may contain one or more processors such as a central processing unit (CPU) 1010, random access memory (RAM) 1020, secondary memory 1030, graphics controller 1060, display unit 1070, network interface 1080, an input interface 1090. All the components except display unit 1070 may communicate with each other over communication path 1050, which may contain several buses as is well known in the relevant arts. The components of FIG. 10 are described below in further detail.

CPU 1010 may execute instructions stored in RAM 1020 to provide several features of the present disclosure. CPU 1010 may contain multiple processing units, with each processing unit potentially being designed for a specific task. Alternatively, CPU 1010 may contain only a single general-purpose processing unit.

RAM 1020 may receive instructions from secondary memory 1030 using communication path 1050. RAM 1020 is shown currently containing software instructions, such as those used in threads and stacks, constituting shared environment 1025 and/or user programs 1026. Shared environment 1025 includes operating systems, device drivers, virtual machines, etc., which provide a (common) run time environment for execution of user programs 1026.

Graphics controller 1060 generates display signals (e.g., in RGB format) to display unit 1070 based on data/instructions received from CPU 1010. Display unit 1070 contains a display screen to display the images defined by the display signals. Input interface 1090 may correspond to a keyboard and a pointing device (e.g., touch-pad, mouse) and may be used to provide inputs. Network interface 1080 provides connectivity to a network (e.g., using Internet Protocol), and may be used to communicate with other systems (such as those shown in FIG. 1, network 106) connected to the network.

Secondary memory 1030 may contain hard drive 1035, flash memory 1036, and removable storage drive 1037. Secondary memory 1030 may store the data software instructions (e.g., for performing the actions noted above with respect to the Figures), which enable digital processing system 1000 to provide several features in accordance with the present disclosure.

Some or all of the data and instructions may be provided on the removable storage unit 1040, and the data and instructions may be read and provided by removable storage drive 1037 to CPU 1010. Floppy drive, magnetic tape drive, CD-ROM drive, DVD Drive, Flash memory, a removable memory chip (PCMCIA Card, EEPROM) are examples of such removable storage drive 1037.

The removable storage unit 1040 may be implemented using medium and storage format compatible with removable storage drive 1037 such that removable storage drive 1037 can read the data and instructions. Thus, removable storage unit 1040 includes a computer readable (storage) medium having stored therein computer software and/or data. However, the computer (or machine, in general) readable medium can be in other forms (e.g., non-removable, random access, etc.).

In this document, the term "computer program product" is used to generally refer to the removable storage unit 1040 or hard disk installed in hard drive 1035. These computer program products are means for providing software to digital processing system 1000. CPU 1010 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 1030. Volatile media includes dynamic memory, such as RAM 1020. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1050. Transmission media can also take the form of acoustic or light waves, such as those generated during radio-wave and infra-red data communications.

In an embodiment of the present disclosure, the system configured for controlled streaming of content, comprising: a content player module 108 configured to enable a first user to request one or more contents on a first computing device 102 through at least one of: search, including voice search one or more keywords on the content player module 108; request continuous play or usage of the one more contents from a pre-established station or service on the content player module 108.

In another embodiment of the present disclosure, the system comprising a content streaming service module 110 configured to establish a PKI (public key infrastructure) for a secure communication between the content player module 108 on the first computing device 102 and a second computing device 104 when a first user's login request received from the content player module 108 to the content streaming service module 110, the content streaming service module 110 configured to send one or more symmetric encryption keys to the content player module 108 on the first computing device 110 through the PKI for the secure communication between the first user and a second user, the content streaming service module 110 configured to deliver the requested one or more contents to the content player module 108 through a payload data that includes stream of contents as well as a management data, when the content player module 108 starts using or playing the one or more contents, the content player module 108 configured to connect to the content streaming service module 110 with a call-home data, whereby the call-home data comprises which content is being played or used, by whom, on what device and in which location for accurate accounting of played or used contents and use in fraud prevention heuristics.

In another embodiment of the present disclosure, the content streaming service module 110 is configured to send an authorization message to the first computing device to manage offline usages through a network 106. The one or more symmetric encryption keys are configured to establish an encrypted communication between the first computing device 102 and the second computing device 104. The content player module 108 is configured to enable the content streaming service module 110 through the call-home data to have a clear and concise accounting at least one of: instant, up-to-the-minute and accurate second user compensation; different first user billing alternatives; and accurate analytics data used for predictions, edits, compositions, sales, targeted marketing and advertising. The content streaming service module 110 is configured to detect a fraudulent use based on fraud detection heuristics and then take an appropriate action to prevent the fraud. The content streaming service module 110 is configured to use a content data to define a heuristic to flag a fraudulent use. The content data comprising at least one of: number of times content is used in a given period of time; if the same one or more contents are played or used repeatedly on the first computing device 102; state of a player playback; and a blacklist state. the content streaming service module 110 is configured to provide one or more fraud-prevention policies comprising at least one: if the first user plays or uses the one or more contents from the second user more than n times in an m hour period, raise a flag and stop serving the stream to the first user device 102 for a p hour period; if the first user attempts to duplicate the content, raise a flag on the first user and self-erase the content; if the first user shares an account to another user, raise a flag on the first user and stop that account from being shared; if the first user attempts to screen record the one or more contents, raise a flag on the first user and stop the first computing device 102 from screen recording.

In another embodiment of the present disclosure, a method for controlled streaming of content, comprising: enabling a first user to request one or more contents on a content player module through at least one of: search, including voice search one or more keywords on the content player module; request continuous play or usage of the one more contents from a pre-established station or service on the content player module; authenticating the content player module on a first computing device by a content streaming service module using an established PKI (public key infrastructure) for encrypting and securing a transaction between the first computing device and a second computing device, the content streaming service module configured to establish the PKI when a first user's login request received from the content player module; sending one or more symmetric encryption keys from the content streaming service module on the second computing device to the first computing device through the established PKI for a secure communication between the first user and a second user; and delivering requested one or more contents to the content player module from the content streaming service module through a payload data that includes stream of contents as well as a management data, when the content player module starts playing or using the one or more contents, the content player module configured to connect to the content streaming service module with a call-home data, whereby the call-home data comprises which content is being played or used, by whom, on what device and in which location for accurate accounting of played or used contents and use in fraud prevention heuristics.

In another embodiment of the present disclosure, a computer program product comprising a non-transitory computer-readable medium having a computer-readable program code embodied therein to be executed by one or more processors, the program code including instructions to: enable a first user to request one or more contents on a content player module 108 through at least one of: search, including voice search one or more keywords on the content player module 108; request continuous play or usage of the one more contents from a pre-established station or service on the content player module 108; authenticate the content player module 108 on a first computing device 102 by a content streaming service module 110 using an established PKI (public key infrastructure) for encrypting and securing a transaction between the first computing device 102 and a second computing device 104, the content streaming service module 110 configured to establish the PKI when a first user's login request received from the content player module 108; send one or more symmetric encryption keys from the content streaming service module 110 on the second computing device 104 to the first computing device 102 through the established PKI for a secure communication between the first user and a second user; and deliver requested one or more contents to the content player module 108 from the content streaming service module 110 through a payload data that includes stream of contents as well as a management data, when the content player module 108 starts playing or using the one or more contents, the content player module 108 configured to connect to the content streaming service module 110 with a call-home data, whereby the call-home data comprises which content is being played or used, by whom, on what device and in which location for accurate accounting of played or used contents and use in fraud prevention heuristics.

In another embodiment of the present disclosure, the content player module 108 comprising an encryption module 203 configured to securely authenticate itself using the established PKI for encrypting and securing the transaction. the content player module 108 comprising a call-home data transfer module 213 configured to send the call-home data to the content streaming service module 110 using the one or more symmetric encryption keys. The content streaming service module 110 comprising a symmetric key generating module 307 configured to randomly generate the one or more symmetric encryption keys based on a user ID and a device ID. The content streaming service module 110 comprising a targeted advertising and marketing module 319 configured to use an activity table for tracking content usage and plays and the collect call-home data for further accurate predictions, edits, compositions, sales, marketing and targeted advertising. The content streaming service module 110 comprising a fraud detection module 321 configured to detect a fraudulent use based on fraud detection heuristics and use at least one of: number of times content is used in a given period of time; if the same one or more contents are played or used repeatedly on the first computing device; state of a player playback; and a blacklist state.

In another embodiment of the present disclosure, the content streaming service module 110 comprising a fraud prevention module 323 configured to provide at least one: if the first user plays or uses the one or more contents from the second user more than n times in an m hour period, raise a flag and stop serving the stream to the first user device for a p hour period; if the first user attempts to duplicate the content, raise a flag on the first user and self-erase the content; if the first user shares an account to another user, raise a flag on the first user and stop that account from being shared; if the first user attempts to screen record the one or more contents, raise a flag on the first user and stop the first computing device from screen recording.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and subcombinations of the various features described hereinabove as well as variations and modifications thereof, which would occur to persons skilled in the art upon reading the foregoing description.

What is claimed is:

1. A system configured for controlled streaming of content, comprising:
    a content player module configured to enable a first user to request one or more contents on a first computing device through at least one of: search one or more keywords on the content player module; request continuous play of the one more contents from a pre-established station on the content player module; and
    a content streaming service module configured to establish a PKI (public key infrastructure) for a secure communication between the content player module on the first computing device and a second computing device when a first user's login request received from the content player module to the content streaming service module, the content streaming service module configured to send one or more symmetric encryption keys to the content player module on the first computing device through the PKI for the secure communication between the first user and a second user, the content streaming service module configured to deliver the requested one or more contents to the content player module through a payload data that includes stream of contents as well as a management data, when the content player module starts playing the one or more contents, the content player module configured to connect to the content streaming service module with a call-home data, whereby the call-home data comprises which content is being played, by whom, on what device and in which location for accurate accounting of played contents and use in fraud prevention heuristics.

2. The system of claim 1, wherein the content streaming service module is configured to send an authorization message to the first computing device to manage offline usages through a network.

3. The system of claim 1, wherein the one or more symmetric encryption keys are configured to establish an encrypted communication between the first computing device and the second computing device.

4. The system of claim 1, wherein the content player module is configured to enable the content streaming service module through the call-home data to have a clear and concise accounting at least one of: instant, up-to-the-minute and accurate second user compensation; different first user billing alternatives; and accurate analytics data used for optimal predictions, targeted marketing and advertising.

5. The system of claim 1, wherein the content streaming service module is configured to detect a fraudulent use based on fraud detection heuristics and then take an appropriate action to prevent the fraud.

6. The system of claim 1, wherein the content streaming service module is configured to use a content data to define a heuristic to flag a fraudulent use.

7. The system of claim 1, wherein the content streaming service module is configured to provide one or more fraud-prevention policies comprising at least one: if the first user plays the one or more contents from the second user more than n times in an m hour period, raise a flag and stop serving the stream to the first user device for a p hour period; if the first user attempts to duplicate the content, raise a flag on the first user and self-erase the content; if the first user shares an account to another user, raise a flag on the first user and stop that account from being shared; if the first user attempts to screen record the one or more contents, raise a flag on the first user and stop the first computing device from screen recording.

8. The system of claim 6, wherein the content data comprising at least one of: number of times content is used in a given period of time; if the same one or more contents are played repeatedly on the first computing device; state of a player playback; and a blacklist state.

9. A method for controlled streaming of content, comprising:
  enabling a first user to request one or more contents on a content player module through at least one of: search one or more keywords on the content player module; request continuous play of the one more contents from a pre-established station on the content player module;
  authenticating the content player module on a first computing device by a content streaming service module using an established PKI (public key infrastructure) for encrypting and securing a transaction between the first computing device and a second computing device, the content streaming service module configured to establish the PKI when a first user's login request received from the content player module;
  sending one or more symmetric encryption keys from the content streaming service module on the second computing device to the first computing device through the established PKI for a secure communication between the first user and a second user; and
  delivering requested one or more contents to the content player module from the content streaming service module through a payload data that includes stream of contents as well as a management data, when the content player module starts playing the one or more contents, the content player module configured to connect to the content streaming service module with a call-home data, whereby the call-home data comprises which content is being played, by whom, on what device and in which location for accurate accounting of played contents and use in fraud prevention heuristics.

10. The method of claim 9, further comprising a step of saving first user's login credentials on the first computing device by the content player module for eliminating the first user to login manually into the content player module every time.

11. The method of claim 9, further comprising a step of streaming the requested one or more contents by the content player module on the first computing device.

12. The method of claim 9, further comprising a step of buffering the content to be played offline on the content player module.

13. The method of claim 12, further comprising a step of retaining call-home data in an output buffer until the first computing device is back online thereby sending the call-home data to the content streaming service module.

14. A computer program product comprising a non-transitory computer-readable medium having a computer-readable program code embodied therein to be executed by one or more processors, the program code including instructions to:
  enable a first user to request one or more contents on a content player module through at least one of: search one or more keywords on the content player module; request continuous play of the one more contents from a pre-established station on the content player module;
  authenticate the content player module on a first computing device by a content streaming service module using an established PKI (public key infrastructure) for encrypting and securing a transaction between the first computing device and a second computing device, the content streaming service module configured to establish the PKI when a first user's login request received from the content player module;
  send one or more symmetric encryption keys from the content streaming service module on the second computing device to the first computing device through the established PKI for a secure communication between the first user and a second user; and
  deliver requested one or more contents to the content player module from the content streaming service module through a payload data that includes stream of contents as well as a management data, when the content player module starts playing the one or more contents, the content player module configured to connect to the content streaming service module with a call-home data, whereby the call-home data comprises which content is being played, by whom, on what device and in which location for accurate accounting of played contents and use in fraud prevention heuristics.

15. The computer program product of claim 14, wherein the content player module comprising an encryption module configured to securely authenticate itself using the established PKI for encrypting and securing the transaction.

16. The computer program product of claim 14, wherein the content player module comprising a call-home data transfer module configured to send the call-home data to the content streaming service module using the one or more symmetric encryption keys.

17. The computer program product of claim 14, wherein the content streaming service module comprising a symmetric key generating module configured to randomly generate the one or more symmetric encryption keys based on a user ID and a device ID.

18. The computer program product of claim 14, wherein the content streaming service module comprising a targeted advertising and marketing module configured to use an activity table for tracking content usage and plays and the collect call-home data for further sales, marketing and targeted advertising.

19. The computer program product of claim 14, wherein the content streaming service module comprising a fraud detection module configured to detect a fraudulent use based on fraud detection heuristics and use at least one of: number of times content is used in a given period of time; if the same one or more contents are played repeatedly on the first computing device; state of a player playback; and a blacklist state.

20. The computer program product of claim 14, wherein the content streaming service module comprising a fraud prevention module configured to provide at least one: if the first user plays the one or more contents from the second user more than n times in an m hour period, raise a flag and stop serving the stream to the first user device for a p hour period; if the first user attempts to duplicate the content, raise a flag on the first user and self-erase the content; if the first user shares an account to another user, raise a flag on the first user and stop that account from being shared; if the first user attempts to screen record the one or more contents, raise a flag on the first user and stop the first computing device from screen recording.

* * * * *